United States Patent [19]

Matsuura et al.

[11] 4,202,953

[45] * May 13, 1980

[54] PROCESS FOR THE PRODUCTION OF POLYOLEFINS

[75] Inventors: Kazuo Matsuura, Kawasaki; Nobuyuki Kuroda, Yokohama; Takeichi Shiraishi, Kawasaki; Mitsuji Miyoshi, Naka, all of Japan

[73] Assignee: Nippon Oil Co., Ltd., Tokyo, Japan

[*] Notice: The portion of the term of this patent subsequent to Nov. 9, 1993, has been disclaimed.

[21] Appl. No.: 6,431

[22] Filed: Jan. 25, 1979

Related U.S. Application Data

[63] Continuation-in-part of Ser. No. 594,244, Jul. 9, 1975, abandoned, which is a continuation of Ser. No. 427,725, Dec. 26, 1973, abandoned.

[30] Foreign Application Priority Data

Dec. 28, 1972 [JP] Japan .................................. 48/3578
Mar. 20, 1973 [JP] Japan .................................. 48/31363

[51] Int. Cl.$^2$ .......................... C08F 4/02; C08F 10/02
[52] U.S. Cl. .............................. 526/125; 252/429 C; 526/155; 526/352
[58] Field of Search .......................................... 526/125

[56] References Cited

U.S. PATENT DOCUMENTS

3,642,746  2/1972  Kashiwa et al. ...................... 526/125

FOREIGN PATENT DOCUMENTS

1958488   5/1970  Fed. Rep. of Germany .
2000566  11/1970  Fed. Rep. of Germany .

Primary Examiner—Edward J. Smith
Attorney, Agent, or Firm—Hill, Van Santen, Steadman, Chiara & Simpson

[57] ABSTRACT

A process for the production of polyolefins using an improved catalyst which exhibits enhanced activity in the polymerization or copolymerization of olefins such that the yields of the polymers or copolymers are increased with a minimum catalyst residue remaining. The catalyst is produced by reacting a magnesium dihalide anhydride with an aluminum alkoxy compound to produce a carrier on which a titanium compound and/or a vanadium compound is applied. The molar ratio of magnesium dihalide to aluminum compound ranges between 1:0.001 to 1:20, and most effectively is in the range of 1:0.05 to 1:5.

5 Claims, No Drawings

PROCESS FOR THE PRODUCTION OF POLYOLEFINS

CROSS-REFERENCE TO RELATED APPLICATIONS

This application is a continuation-in-part of our co-pending Ser. No. 594,244, filed July 9, 1975 which, in turn, was a continuation of Ser. No. 427,725, filed Dec. 26, 1973, both applications now abandoned.

BACKGROUND OF THE INVENTION

1. Field of the Invention

This invention relates to the polymerization or copolymerization of olefins in the presence of novel catalysts. The catalysts are produced by reacting magnesium halide anhydrides with aluminum alkoxy compounds, usually containing halide atoms to form a carrier for titanium and/or vanadium compounds, the catalysts being activated by an organometallic compound.

2. Description of the Prior Art

Catalysts for the production of polyolefins have been known which include transition metals such as titanium and vanadium carried on a magnesium halide as disclosed, for example, in Japanese Patent Publication No. 39-12105. Another similar catalyst is described in Belgian Pat. No. 742,112 and includes titanium tetrachloride carried on a magnesium halide anhydride which has been activated by a ball mill.

Admixtures of magnesium halide anhydrides and inorganic solid compounds on which a titanium compound is carried are disclosed in Belgian Pat. No. 770,174 and German Pat. No. 2,137,872.

Other types of catalysts involving improved carriers for the catalyst material are described in U.S. Pat. No. 3,642,746; German Pat. No. 2,000,566 and German Pat. No. 1,958,488.

SUMMARY OF THE INVENTION

The present invention provides a process for the polymerization or copolymerization of olefins using a novel catalyst which exhibits a maximum amount of catalytic activity to permit using reduced monomer partial pressures and reduced reaction times, with minimum catalyst residues remaining in the resulting polymer. The catalyst produced in accordance with the present invention can be prepared very easily without complicated mechanical procedures. The catalyst can be produced from the components either in solid dry form or in the form of a solution. The polymerization or copolymerization of olefins takes place at a temperature of about 20° to 300° C. at a pressure of atmospheric to about 70 kg/cm².

The catalysts of the present invention result from reacting a magnesium dihalide anhydride with either an alkoxy aluminum or an alkoxy aluminum halide at temperatures between 20° C. and 400° C. in a molar ratio of magnesium dihalide to aluminum ranging from 1:0.001 to 1:20, thereby forming a carrier. This carrier is contacted with a transition metal compound at a temperature of 50° to 300° C., the transition compound being a titanium and/or vanadium compound which is liquid under the treatment conditions, and present in amounts of from 0.1 to 50 times the amount of the carrier by weight. This resulting catalyst is then activated with the use of an organometal compound of a metal of Groups I to IV of the Periodic Table, as is conventional with Ziegler type catalysts.

DESCRIPTION OF THE PREFERRED EMBODIMENTS

The catalysts of the invention are characteristically different from the above cited prior art teachings in that much higher catalytic activity; i.e., increased yield of polymer, is achieved as compared to magnesium halides alone. While the structural details of a carrier comprising a magnesium dihalide anhydride and an aluminum compound according to the invention are not completely known, it is believed that the two components react with each other and form a novel effective carrier.

The term magnesium dihalide anhydride as used in the practice of the invention includes anhydrides of magnesium fluoride, magnesium chloride, magnesium bromide, magnesium iodide and mixtures thereof. They may be any of those currently available on the market which may be in polar solvents such as alcohol, acetone and ether, may be re-settled in any of these solvents, or may be obtained from Grignard's compounds in a well known manner. The particle size of the magnesium dihalides is not critical but is preferably below 200 microns. There is no particular restriction imposed on the manner of blending and heating magnesium dihalides and aluminum compounds according to the invention. They may be reacted in the absence of solvents, or in the presence of organic solvents such as inert hydrocarbons, alcohols, ethers, ketones, esters and the like which may be removed conveniently during heating of the two compounds. It is preferable to use alcohol or the like in which the two compounds can be dissolved to make a homogeneous solution such that they can be sufficiently mixed and heated and thereafter the solvent is removed.

It has now been found that the blending ratio of magnesium dihalide to aluminum compound should be in the range of 1:0.001 to 1:20; preferably in the range of 1:0.01 to 1:10; more preferably in the range of 1:0.05 to 1:5, to give best results. Departure from these ranges, either greater or smaller, would result in reduced polymerization activity. Temperatures at which the two compounds may be satisfactorily reacted are in the range of 20° to 400° C., preferably 50° to 300° C.

The aluminum compound contemplated under the invention is represented by the general formula:

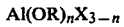

$$Al(OR)_n X_{3-n}$$

where R is an alkyl, aryl and/or aralkyl group; X is a halogen atom; and n is an integer between 1 and 3. R or X may be of the same or different substituents. R should normally be 1 to 24 in carbon number, preferably 2 to 12. Typical examples of this aluminum compound are aluminum trimethoxide, aluminum triethoxide, aluminum diethoxy-mono-n-propoxide, aluminum tri-n-propoxide, aluminum monoethoxydiisopropoxide, aluminum triisopropoxide, aluminum tri-n-butoxide, aluminum tri-sec-butoxide, aluminum tri-t-butoxide, aluminum triphenoxide, aluminum dimethoxymonochloride, aluminum monoethoxydichloride, aluminum diethoxymonochloride, aluminum diethoxymonobromide, aluminum diisopropoxymonochloride, aluminum di-n-butoxymonochloride, aluminum di-sec-butoxymonochloride, aluminum di-sec-butoxymonobromide, aluminum di-t-butoxymonochloride, aluminum diphenoxymonochloride, and aluminum monoethoxymono-secbutoxymonochloride. The manner of carrying titanium and/or vanadium on the reaction product (carrier) of the magnesium halide and aluminum compound is not restricted. This may be done by contacting the carrier in solid phase with the transition metal under heated conditions either in the presence or absence of inert solvents, but preferably in the absence of such solvents, at temperatures ranging between 50° and 300° C., preferably 100° and 150° C. Time length for the reaction is not particularly critical and may be usually 5 minutes or longer, say up to 10 hours. The reaction must, needless to mention, be carried out in an inert gas atmosphere free of oxygen and moisture. The transition metal halides may be used in amounts of 0.1 to 50 times the amount of the carrier. Excess metal halides after treatment should be cleaned and removed preferably with solvents. Unreacted transition metal compounds may be removed for instance with use of solvents inert to Ziegler catalysts, which solvents may be evaporated at reduced pressure so as to obtain solid particles in the usual manner.

The polymerization of olefins according to the invention is carried out in very much the same way as it is done in the presence of Ziegler catalysts where the reaction takes place in an atmosphere substantially free of oxygen and water. It is carried out at a temperature of 20° to 200° C., preferably 50° to 180° C. and at a pressure of normal to 70 kg/cm², preferably 2 to 60 kg/cm². Molecular weights of the resulting polymer may be regulated to some extent by varying the polymerization temperature as well as the quantities of catalysts but can be more effectively regulated by the addition of hydrogen in the polymerization admixture.

The process of the invention may be applied to all olefins polymerizable with use of Ziegler catalysts and more specifically to the polymerization of alpha-olefins such as ethylene, propylene, and butene-1 and to the copolymerization of ethylene and propylene, ethylene and 1-butene, and propylene and 1-butene, with satisfactory results.

The term "transition metal compounds" means titanium and vanadium halides which assume a liquid phase under treatment conditions according to the invention. Typical examples are titanium halides such as titanium tetrachloride, titanium tetrabromide, ethoxy trichlorotitanium, diethoxy dichlorotitanium, dibutoxy dichlorotitanium and phenoxy trichlorotitanium, vanadium halides such as vanadium tetrachloride and oxytrichlorovanadium.

The organometal compound employed in accordance with the invention may be those classed in the Groups I–IV of the Periodic Table which are known as Ziegler catalyst components, and of which organoaluminum and organozinc compounds are preferred.

The organoaluminum compounds may be represented by the general formulae:

$R_3Al$, $R'_2AlX$, $R'AlX_2$, $R'_2AlOR$, $R'Al(OR)X$ and $R'_3Al_2X_3$ where R is an alkyl or aryl group and X is a halogen atom; typical examples of which organoaluminum compounds are triethylaluminum, triisobutylaluminum and diethylaluminum chloride.

The organozinc compounds may be represented by the general formula:

$R''_2Zn$ where R" is an alkyl group; one example of which organozinc compounds is diethyl zinc.

These organometal compounds are used in amounts of 0.1 to 100 mol times greater than the transition metal halides in the practice of the invention.

The following examples are provided for a better understanding of the invention but are not intended to impose limitations on the invention.

INVENTIVE EXAMPLE I (a) Preparation of the Catalyst 10 grams of magnesium chloride were dried at 150° C. for 3 hours, followed by the addition of 40 milliliters of ethanol and 5.9 grams of aluminum tri-sec-butoxide. The admixture was heated at 200° C. to make a homogeneous solution. Reaction was continued at this temperature for 2 hours, whereafter 100 milliliters of n-hexane were added to settle the magneisum chloride, with the supernatant liquid removed. The solvents were then removed at reduced pressure, whereupon there was obtained a white dry solid compound. 40 milliliters of titanium tetrachloride were added to this compound and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 12.1 milligrams of titanium carried on 1 gram solid.

(b) Polymerization

To nitrogen-purged, 2-liter stainless autoclave equipped with a stirrer were charged 1,000 milliliters hexane, 6 millimols triethyl aluminum and 88.4 milligrams solid of the above-stated catalyst. The whole was stirred and heated to a temperature of 90° C. The admixture having a pressure of 2 kg/cm² on account of hexane vapor pressure, was charged with hydrogen to a total pressure of 6 kg/cm² and then with ethylene to a total pressure of 10 kg/cm². The polymerization reaction was thus continued for 15 minutes with continued charge of ethylene to maintain a total pressure of 10 kg/cm². Upon completion of the reaction, the resulting polymeric slurry was taken into a beaker with hexane removed at reduced pressure. There was obtained 152.0 grams white polyethylene having a melt index of 10.6. Polymerization activity was represented by 1,720 grams polyethylene per gram solid per hour per ethylene pressure, or 142,000 grams polyethylene per gram titanium per hour per ethylene pressure.

COMPARATIVE EXAMPLE I

The procedures of Inventive Example I was followed with the exception that aluminum tri-sec-butoxide was not used. There was obtained a catalyst consisting of 8.1 milligrams titanium carried on 1 gram of carrier. 169.7 milligrams of this catalyst were used in the polymerization of ethylene which took place for 30 minutes substantially in the same manner as described in Inventive Example I. There was obtained 95.3 grams white polyethylene having a melt index of 7.1. Polymerization activity was represented by 282 grams polyethylene per gram solid per hour per ethylene pressure, or 34,800 grams polyethylene per gram titanium per hour per ethylene pressure.

INVENTIVE EXAMPLE II

The procedure of Inventive Example I was followed in preparing the catalyst with the exception that 2.36 grams aluminum tri-sec-butoxide was used, whereby there was a solid catalyst consisting of 10.7 milligrams titanium carried per gram solid. Polymerization of ethylene was effected with use of 11.35 milligrams of this solid catalyst for 15 minutes. There was obtained 154.5 grams white polyethylene having a melt index of 8.3. Polymerization activity was represented by 127,000 grams polyethylene per gram titanium per hour per ethylene pressure or 1,360 grams polyethylene per gram solid per hour per ethylene pressure.

INVENTIVE EXAMPLE III (a) Preparation of the Catalyst
  Transition metal compound: Titanium tetrachloride
  Aluminum compound: 3.9 grams aluminum triethoxide
  Catalyst: 11.5 milligrams titanium carried per gram solid
(b) Polymerization
  Olefin: Ethylene
  Catalyst: 126.1 milligrams
  Organometal compound: 6 millimols triethylaluminum
  Polymerization time: 15 minutes
  Yield: 211 grams white polyethylene, melt index 9.6
  Polymerization activity: 1,670 grams polyethylene per gram solid per hour ethylene pressure, or 145,000 grams polyethylene per gram titanium per hour per ethylene pressure

INVENTIVE EXAMPLE IV (a) Preparation of the Catalyst
  Transition metal compound: Titanium tetrachloride
  Aluminum compound: 1.6 grams aluminum triethoxide
  Catalyst: 9.8 grams titanium per gram solid
(b) Polymerization
  Olefin: Ethylene
  Catalyst: 103.3 milligrams
  Organometal compound: 6 millimols triethylaluminum
  Polymerization time: 15 minutes
  Yield: 123.0 grams white polyethylene, melt index 8.5
  Polymerization activity: 121,000 grams polyethylene per gram titanium per hour per ethylene pressure, or 1,190 grams polyethylene per gram solid per hour per ethylene pressure

INVENTIVE EXAMPLE V (a) Preparation of the Catalyst
  Transition metal compound: Titanium tetrachloride
  Aluminum compound: 15.6 grams aluminum ethoxide
  Catalyst: 183 milligrams titanium per gram solid
(b) Polymerization
  Olefin: Ethylene
  Catalyst: 145.1 milligrams
  Organometal compound: 6 millimols triethylaluminum
  Polymerization time: 15 minutes
  Yield: 204.0 grams white polyethylene, melt index 7.4
  Polymerization activity: 76,500 grams polyethylene per gram titanium per hour per ethylene pressure, or 1,400 grams polyethylene per gram solid per hour per ethylene pressure

INVENTIVE EXAMPLE VI (a) Preparation of the Catalyst
  Same as in Inventive Example I
(b) Polymerization
  Olefin: Ethylene
  Catalyst: 121.6 milligrams
  Organometal compound: 10 millimols diethylzinc
  Polymerization time: 15 minutes
  Yield: 86.9 grams white polyethylene, melt index 4.3
  Polymerization activity: 715 grams polyethylene per gram solid per hour per ethylene pressure, or 59,000 grams polyethylene per gram titanium per hour per ethylene pressure

COMPARATIVE EXAMPLE II (a) Preparation of the Catalyst
  Same as in Comparative Example I
(b) Polymerization
  Olefin: Ethylene
  Catalyst: 153.8 milligrams
  Organometal compound: 10 millimols diethylzinc
  Polymerization time: 15 minutes
  Yield: 18.3 grams white polyethylene, melt index 3.8
  Polymerization activity: 119 grams polyethylene per gram solid per hour per ethylene pressure, or 14,700 grams polyethylene per gram titanium per hour per ethylene pressure

INVENTIVE EXAMPLE VII (a) Preparation of the Catalyst
  Transition metal compound: Vanadium tetrachloride
  Aluminum compound: 5.9 grams aluminum tri-sec-butoxide
  Catalyst: 10.6 milligrams vanadium per gram solid
(b) Polymerization
  Olefin: Ethylene
  Catalyst: 184.1 milligrams
  Organometal compound: 6 millimols triethylaluminum
  Polymerization time: 15 minutes
  Yield: 236.0 grams white polyethylene
  Polymerization activity: 1,280 grams polyethylene per gram solid per hour per ethylene pressure, or 121,000 grams polyethylene per gram solid per hour per ethylene pressure

INVENTIVE EXAMPLE VIII (a) Preparation of the Catalyst
  Same as in Inventive Example I
(b) Polymerization
  To nitrogen-purged autoclave were charged 1,000 milliliters hexane, 5 millimols triethyl aluminum and 86.3 milligrams catalyst. Hydrogen was charged up to 1.5 kg/cm$^2$G, followed by addition of ethylene-propylene gas containing 2 mol percent propylene at 70° C. With autoclave pressure maintained at 7 kg/cm$^2$G, the reaction was continued for 30 minutes until there was obtained 224.0 grams white ethylene-propylene copolymer. Polymerization activity was represented by 1,150 grams polyethylene per gram solid per hour per ethylene pressure, or 95,000 grams polyethylene per gram titanium per hour per ethylene pressure. The resulting product was analyzed by infrared spectrum and thereby ascertained to be a copolymer.

INVENTIVE EXAMPLE IX (a) Preparation of the Catalyst

To nitrogen-purged 300 milliliter flask equipped with stirrer and recycling cooler were charged 10 grams of magnesium chloride anhydride, which were then vacuum-dried at 150° C. for 3 hours, followed by the addition of 33.6 grams ethanol. The admixture was then stirred at 100° C. to dissolve magnesium chloride, whereupon there was charged 8 grams Al(OEt)$_2$Cl. The reaction was continued at 200° C. for 2 hours. Temperature was increased to 250° C. and pressure reduced thereby obtaining a white particulate product. To this product was added 50 milliliters titanium tetrachloride, and these were reacted at 130° C. for 1 hour. The reaction product was washed with hexane until titanium tetrachloride was no longer found in the wash liquid. The resulting solid compound was analyzed to show the presence of 23.1 milligrams titanium carried per gram solid.

(b) Polymerization

To nitrogen-purged 2-liter stainless autoclave equipped with stirrer were charged 1,000 milliliters hexane, 5 millimols triethyl aluminum and 142 milligrams solid catalyst obtained as above. The whole was stirred and heated to a temperature of 90° C. The admixture having a pressure of 2 kg/cm$^2$ on account of hexane vapor pressure, was charged with hydrogen to a total pressure of 6 kg/cm$^2$ and then with ethylene to a total pressure of 10 kg/cm$^2$. The polymerization reaction was thus continued for 15 minutes with continued charge of ethylene to maintain a total pressure of 10 kg/cm$^2$. Upon completion of the reaction, the resulting polymeric slurry was taken into a beaker with hexane removed at reduced pressure. There was obtained 135 grams white polyethylene having a melt index of 8.8. Polymerization activity was represented by 41,300 grams polyethylene per gram titanium per hour per ethylene pressure, or 954 grams polyethylene per gram solid per hour per ethylene pressure.

INVENTIVE EXAMPLE X (a) Preparation of the Catalyst
  Transition metal compound: Titanium tetrachloride
  Aluminum compound: 16 grams Al(OEt)$_2$Cl
  Catalyst: 29.3 milligrams titanium per gram solid
(b) Polymerization
  Olefin: Ethylene
  Catalyst: 81 milligrams
  Organometal compound: 5 millimols triethyl aluminum
  Polymerization time: 15 minutes
  Yield: 110 grams polyethylene, melt index 6.2
  Polymerization activity: 46,500 grams polyethylene per gram titanium per hour per ethylene pressure, or 1,360 grams polyethylene per gram solid per hour per ethylene pressure

INVENTIVE EXAMPLE XI (a) Preparation of the Catalyst
  Transition metal compound: Titanium tetrachloride
  Aluminum compound: 7.5 grams Al(OEt)$_2$Cl
  Catalyst: 19.5 milligrams titanium carried per gram solid
(b) Polymerization
  Olefin: Ethylene
  Catalyst: 150 milligrams
  Organometal compound: 5 millimols triethyl aluminum
  Polymerization time: 15 minutes
  Yield: 153 grams polyethylene, melt index 5.3
  Polymerization activity: 52,400 grams polyethylene per gram titanium per hour per ethylene pressure, or 1,020 grams polyethylene per gram solid per hour per ethylene pressure

INVENTIVE EXAMPLE XII (a) Preparation of the Catalyst
  Transition metal compound: Titanium tetrachloride
  Aluminum compound: 10.9 grams Al(OsecBu)$_2$Cl
  Catalyst: 17.4 milligrams titanium per gram solid
(b) Polymerization
  Olefin: Ethylene
  Catalyst: 107 milligrams
  Organometal compound: 5 millimols triethyl aluminum
  Polymerization time: 15 minutes
  Yield: 108 grams polyethylene, melt index 8.1
  Polymerization activity: 58,300 grams polyethylene per gram titanium per hour per ethylene pressure, or 1,010 grams polyethylene per gram solid per hour per ethylene pressure

INVENTIVE EXAMPLE XIII (a) Preparation of the Catalyst
  Same as in Inventive Example IX
(b) Polymerization
  Olefin: Ethylene
  Catalyst: 161 milligrams
  Organometal compound: 5 millimols diethylzinc
  Polymerization time: 15 minutes
  Yield: 140 grams polyethylene, melt index 9.5
  Polymerization activity: 37,500 grams polyethylene per gram titanium per hour per ethylene pressure, or 870 grams polyethylene per gram solid per hour per ethylene pressure

INVENTIVE EXAMPLE XIV (a) Preparation of the Catalyst
  Transition metal compound: Vanadium tetrachloride
  Aluminum compound: 8 grams Al(OEt)$_2$Cl
  Catalyst: 17.3 milligrams vanadium per gram solid
(b) Polymerization
  Olefin: Ethylene
  Catalyst: 174 milligrams
  Organometal compound: 5 millimols triethyl aluminum
  Polymerization time: 15 minutes
  Yield: 120 grams polyethylene, melt index 4.3
  Polymerization activity: 39,900 grams vanadium per hour per ethylene pressure, or 690 grams polyethylene per gram solid per hour per ethylene pressure

INVENTIVE EXAMPLE XV (a) Preparation of the Catalyst
  Same as in Inventive Example IX
(b) Polymerization
  To nitrogen-purged autoclave were charged 1,000 milliliters hexane, 5 millimols triethyl aluminum and 143 milligrams catalyst. Hydrogen was charged up to 1.5 kg/cm$^2$, followed by addition of ethylene-propylene gas containing 2 mol percent propylene at 70° C. With autoclave pressure maintained at 7 kg/cm$^2$, the reaction was continued for 15 minutes, until there was obtained 133 grams ethylene-propylene copolymer having 7.1 methyl groups per 1,000 carbon atoms and a melt index of 8.2. Polymerization activity was measured by 40,200 grams polymer per gram titanium per hour per ethylene pressure, or 930 grams polymer per gram solid per hour per ethylene pressure.

COMPARATIVE EXAMPLE III (a) Preparation of Catalyst According to German OS No. 1,958,488

Ten grams of magnesium chloride were dried at 150° C. for 3 hours, followed by the addition of 40 milliliters of ethanol. The mixture was heated at 200° C. to make a homogeneous solution. Reaction was continued at this temperature for 2 hours, whereupon 100 milliliters of n-hexane were added to precipitate the magnesium chloride, and the supernatant liquid was removed. The solvents were then removed at reduced pressure, leaving a white dry solid compound. Forty milliliters of titanium tetrachloride were added to this compound and heated at 150° C. for 1 hour with stirring. Excess titanium tetrachloride was removed by decantation. The mixture was then washed with n-hexane until titanium tetrachloride no longer appeared in the wash liquid. The resulting solid compound was analyzed and showed 8.1 milligrams of titanium carried on 1 gram of the solid carrier.

(b) Polymerization

To a nitrogen-purged, 2 liter stainless autoclave equipped with a stirrer, there was charged 1,000 milliliters of hexane, 6 millimols of triethyl aluminum and 170 milligrams of the above-described solid catalyst. The mixture was stirred and heated to a temperature of 90° C. The mixture had a pressure of 2 kg/cm² because of the hexane vapor pressure, and the vessel was charged with hydrogen to a total pressure of 6 kg/cm² and then with ethylene to a total pressure of 10 kg/cm². Polymerization reaction was continued for 30 minutes with continued introduction of ethylene to maintain a total pressure of 10 kg/cm². Upon completion of the reaction, the resulting polymeric slurry was taken into a beaker, and the hexane was removed at reduced pressure. There was obtained 95.3 grams of white polyethylene having a melt index of 7.1. The polymerization activity was 282 grams polyethylene per gram solid per hour per ethylene pressure, or 34,800 grams polyethylene per gram titanium per hour per ethylene pressure.

COMPARATIVE EXAMPLE IV (a) Preparation of Catalyst According to U.S. Pat. No. 3,642,746

Ten grams of magnesium chloride were dried at 150° C. for 3 hours, followed by the addition of 9.5 grams of ethanol in n-hexane. The n-hexane was then removed at a reduced pressure at room temperature, whereupon there was obtained a white dry solid compound. Forty milliliters of titanium tetrachloride were added to this compound and heated at 150° C. for 1 hour with stirring. Excess titanium tetrachloride was removed by decantation. The mixture was thereafter washed with n-hexane until titanium tetrachloride no longer appeared in the wash liquid. The resulting compound was analyzed and showed the presence of 116 milligrams of titanium carried on 1 gram of the solid.

(b) Polymerization

To a nitrogen purged, 2 liter stainless steel autoclave equipped with a stirrer that was charged 1,000 milliliters of hexane, 6 millimols of triethyl aluminum and 409 milligrams of the solid catalyst described above. The mixture was stirred and heated to a temperature of 90° C. The mixture had a pressure of 2 kg/cm² because of the hexane vapor pressure and was charged with hydrogen to a total pressure of 6 kg/cm² and then with ethylene to a total pressure of 10 kg/cm². The polymerization reaction was continued for 15 minutes with continued introduction of ethylene to maintain a total pressure of 10 kg/cm². Upon completion of the reaction, the resulting polymeric slurry was taken into a beaker and hexane was removed at reduced pressure. There was obtained 30 grams of white polyethylene having a melt index of 20 or more. The polymerization activity amounted to 730 grams polyethylene per gram solid per hour per ethylene pressure, or 6,300 grams polyethylene per gram titanium per hour per ethylene pressure.

COMPARATIVE EXAMPLE V (a) Preparation of Catalyst According to German OS No. 2,000,566

The procedure of Inventive Example I was followed except that magnesium chloride was not used and the aluminum tri-sec-butoxide alone was treated. There was obtained a white solid compound. Forty milliliters of titanium tetrachloride were added to this compound and heated at 150° C. for 1 hour with stirring. Excess titanium tetrachloride was removed by decantation. The mixture was thereafter washed with n-hexane until titanium tetrachloride no longer appeared in the wash liquid. The resulting solid compound was analyzed and found to contain 36 milligrams of titanium on 1 gram of the solid carrier.

(b) Polymerization

To a nitrogen purged, 2-liter of stainless autoclave equipped with a stirrer were charged 1,000 milliliters of hexane, 6 millimols of triethyl aluminum and 146 milligrams of the solid catalyst described above. The mixture was stirred and heated to a temperature of 90° C. The mixture had a pressure of 2 kg/cm² on account of hexane vapor pressure, and was charged with hydrogen to a total pressure of 6 kg/cm² and then with ethylene to a total pressure of 10 kg/cm². The polymerization reaction was continued for 15 minutes with continued introduction of ethylene to maintain a total pressure of 10 kg/cm². Upon completion of the reaction, the resulting polymeric slurry was taken into a beaker with hexane being removed at reduced pressure. There was obtained 22 grams of white polyethylene having a melt index of 20 or more. The polymerization activity was represented by 50 grams of polyethylene per gram solid per hour ethylene pressure or 1,390 grams polyethylene per gram titanium per hour per ethylene pressure.

To illustrate the differences in structure between the composition of the present invention and prior art aluminum complexes, the following tests were run. The complex $Mg[Al(OEt)_4]_2$ was prepared according to the method given by Meerwein, Ann. 476 (1929) page 135. Specifically, 4.8 grams (0.2 mol) of magnesium particles and 10.8 grams (0.4 mol) of aluminum particles were dried at 200° C. under vacuum for 1 hour followed by the addition of 200 ml. ethanol and small amounts of mercuric chloride and iodine. The reaction was continued for 4 hours under ethanol reflux conditions, until there was obtained a distillate having a boiling range of 235 to 240° C. at 4 millimeters mercury pressure. The resulting complex was analyzed as follows:

|     | Found, wt. % | Theory, wt. % |
| --- | --- | --- |
| Mg. | 5.8 | 5.3 |
| Al  | 12.4 | 12.4 |

| | Found, wt. % | Theory, wt. % |
|---|---|---|
| OEt group | 81.8 | 82.3 |

Infrared absorption spectrum analyses were carried out on the complex identified above, as well as the support according to the present ivention containing MgCl$_2$+Al (O·sec.Bu)$_3$ and the complex Mg(OEt)$_2$. These analyses were made by the use of the Nujol mull method.

The absorption of the MgO bond is at 500 cm$^{-1}$ and at 525 cm$^{-1}$ in the case of the complex Mg(OEt)$_2$. In the case of the complex Mg[Al (OEt)$_4$]$_2$, the MgO absorption occurred in the vicinity of 480 cm$^{-1}$. In contrast, there was no absorption peak found in the MgO band absorption region in the support produced according to the present invention. This means that the support according to the present invention is chemically different from the aforementioned magnesium-aluminum complex. The physical properties of the two materials were also found to be considerably different. The surface area of the support according to the present invention measured 67.3 m$^2$ while that of the magnesium-aluminum complex was 1 m$^2$ or less. The melting point of the support of the present invention was at least 300° C., while the magnesium-aluminum complex melted at about 132° C.

INVENTIVE EXAMPLE XVI (a) Preparation of the Catalyst 10 grams of magnesium chloride were dried at 150° C. for 3 hours, followed by the addition of 40 milliliters of n-hexane and 0.26 grams of aluminum tri-sec-butoxide. The admixture was reacted at 20° C. for 5 hours, whereafter 100 milliliters of n-hexane were added to settle the reaction product, with the supernatant liquid removed. The solvents were then removed at reduced pressure, whereupon there was obtained a white dry solid compound. 40 milliliters of titanium tetrachloride were added to this compound and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 18.3 milligrams of titanium carried on 1 gram solid.

(b) Polymerization

To nitrogen-purged, 2-liter stainless autoclave equipped with a stirrer were charged 1,000 milliliters hexane, 5 millimols triethyl aluminum and 100 milligrams solid of the above-stated catalyst. The whole was stirred and heated to a temperature of 90° C. The admixture having a pressure of 2 kg/cm$^2$ on account of hexane vapor pressure, was charged with hydrogen to a total pressure of 6 kg/cm$^2$ and then with ethylene to a total pressure of 10 kg/cm$^2$. The polymerization reaction was thus continued for 15 minutes with continued charge of ethylene to maintain a total pressure of 10 kg/cm$^2$. Upon completion of the reaction, the resulting polymeric slurry was taken into a beaker with hexane removed at reduced pressure. There was obtained 122 grams white polyethylene having a melt index of 8.3. Polymerization activity was represented by 1220 grams polyethylene per gram solid per hour per ethylene pressure, or 66,670 grams polyethylene per gram titanium per hour per ethylene pressure.

INVENTIVE EXAMPLE XVII (a) Preparation of the Catalyst 10 grams of magnesium chloride were dried at 150° C. for 3 hours, followed by the addition of 150 milliliters of n-hexane and 260 grams of aluminum tri-sec-butoxide. The admixture was reacted at 20° C. for 5 hours, whereafter 100 milliliters of n-hexane were added to settle the reaction product, with the supernatant liquid removed, which was repeated several times. The solvents were then removed at reduced pressure, whereupon there was obtained a white dry solid compound. 40 milliliters of titanium tetrachloride were added to this compound and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 43 milligrams of titanium carried on 1 gram solid.

(b) Polymerization

To nitrogen-purged, 2-liter stainless autoclave equipped with a stirrer were charged 1,000 milliliters hexane, 5 millimols triethyl aluminum and 100 milligrams solid of the above-stated catalyst. The whole was stirred and heated to a temperature of 90° C. The admixture having a pressure of 2 kg/cm$^2$ on account of hexane vapor pressure, was charged with hydrogen to a total pressure of 6 kg/cm$^2$ and then with ethylene to a total pressure of 10 kg/cm$^2$. The polymerization reaction was thus continued for 15 minutes with continued charge of ethylene to maintain a total pressure of 10 kg/cm$^2$. Upon completion of the reaction, the resulting polymeric slurry was taken into a beaker with hexane removed at reduced pressure. There was obtained 135 grams white polyethylene having a melt index of 9.5. Polymerization activity was represented by 1,350 grams polyethylene per gram solid per hour per ethylene pressure, or 31,400 grams polyethylene per gram titanium per hour per ethylene pressure.

COMPARATIVE EXAMPLE VI (a) Preparation of the Catalyst 10 grams of magnesium chloride were dried at 150° C. for 3 hours, followed by the addition of 40 milliliters of n-hexane. The admixture was maintained at 20° C. for 5 hours. The solvents were then removed at reduced pressure, whereupon there was obtained a white dry solid compound. 40 milliliters of titanium tetrachloride were added to this compound and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 9.6 milligrams of titanium carried on 1 gram solid.

(b) Polymerization

To nitrogen-purged, 2-liter stainless autoclave equipped with a stirrer were charged 1,000 milliliters hexane, 5 millimols triethyl aluminum and 100 milligrams solid of the above-stated catalyst. The whole was stirred and heated to a temperature of 90° C. The admixture having a pressure of 2 kg/cm$^2$ on account of hexane vapor pressure, was charged with hydrogen to a total pressure of 6 kg/cm$^2$ and then with ethylene to a total pressure of 10 kg/cm$^2$. The polymerization reaction was thus continued for 15 minutes with continued charge of ethylene to maintain a total pressure of 10 kg/cm². Upon completion of the reaction, the resulting polymeric slurry was taken into a beaker with hexane removed at reduced pressure. There was obtained 25 grams white polyethylene having a melt index of 5.7. Polymerization activity was represented by 250 grams polyethylene per gram solid per hour per ethylene pressure, or 26,040 grams polyethylene per gram titanium per hour per ethylene pressure.

INVENTIVE EXAMPLE XVIII (a) Preparation of the Catalyst 10 grams of magnesium chloride were dried at 150° C. for 3 hours, followed by the addition of 60 milliliters of decaline and 0.13 grams of aluminum trimethoxide. The admixture was heated at 300° C. Reaction was continued at this temperature for 2 hours, whereafter 100 milliliters of n-hexane were added to settle the reaction product, with the supernatant liquid removed. The solvents were then removed at reduced pressure, whereupon there was obtained a white dry solid compound. 40 milliliters of titanium tetrachloride were added to this compound and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 15.5 milligrams of titanium carried on 1 gram solid.

(b) Polymerization

To nitrogen-purged, 2-liter stainless autoclave equipped with a stirrer were charged 1,000 milliliters hexane, 5 millimols triethyl aluminum and 100 milligrams solid of the above-stated catalyst. The whole was stirred and heated to a temperature of 90° C. The admixture having a pressure of 2 kg/cm² on account of hexane vapor pressure, was charged with hydrogen to a total pressure of 6 kg/cm² and then with ethylene to a total pressure of 10 kg/cm². The polymerization reaction was thus continued for 15 minutes with continued charge of ethylene to maintain a total pressure of 10 kg/cm². Upon completion of the reaction, the resulting polymeric slurry was taken into a beaker with hexane removed at reduced pressure. There was obtained 58 grams white polyethylene having a melt index of 7.9. Polymerization activity was represented by 580 grams polyethylene per gram solid per hour per ethylene pressure, or 37,420 grams polyethylene per gram titanium per hour per ethylene pressure.

INVENTIVE EXAMPLE XIX (a) Preparation of the Catalyst 10 grams of magnesium chloride were dried at 150° C. for 3 hours, followed by the addition of 150 milliliters of decaline and 1.26 grams of aluminum trimethoxide. The admixture was heated at 300° C. Reaction was continued at this temperature for 2 hours, whereafter 1,000 milliliters of n-hexane were added to settle the reaction product, with the supernatant liquid removed. The solvents were then removed at reduced pressure, whereupon there was obtained a white dry solid compound. 40 milliliters of titanium tetrachloride were added to this compound and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 17.5 milligrams of titanium carried on 1 gram solid.

(b) Polymerization

To nitrogen-purged, 2-liter stainless autoclave equipped with a stirrer were charged 1,000 milliliters hexane, 5 millimols triethyl aluminum and 100 milligrams solid of the above-stated catalyst. The whole was stirred and heated to a temperature of 90° C. The admixture having a pressure of 2 kg/cm² on account of hexane vapor pressure, was charged with hydrogen to a total pressure of 6 kg/cm² and then with ethylene to a total pressure of 10 kg/cm². The polymerization reaction was thus continued for 15 minutes with continued charge of ethylene to maintain a total pressure of 10 kg/cm². Upon completion of the reaction, the resulting polymeric slurry was taken into a beaker with hexane removed at reduced pressure. There was obtained 54 grams white polyethylene having a melt index of 6.8. Polymerization activity was represented by 540 grams polyethylene per gram solid per hour per ethylene pressure, or 30,860 grams polyethylene per gram titanium per hour per ethylene pressure.

COMPARATIVE EXAMPLE VII (a) Preparation of the Catalyst 10 grams of magnesium chloride were dried at 150° C. for 3 hours, followed by the addition of 40 milliliters of decaline. The admixture was heated at 300° C. for 2 hours, whereafter 100 milliliters of n-hexane were added to settle the magnesium chloride, with the supernatant liquid removed. The solvents were then removed at reduced pressure, whereupon there was obtained a white dry solid compound. 40 milliliters of titanium tetrachloride were added to this compound and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 6.1 milligrams of titanium carried on 1 gram solid.

(b) Polymerization

To nitrogen-purged, 2-liter stainless autoclave equipped with a stirrer were charged 1,000 milliliters hexane, 5 millimols triethyl aluminum and 100 milligrams solid of the above-stated catalyst. The whole was stirred and heated to a temperature of 90° C. The admixture having a pressure of 2 kg/cm² on account of hexane vapor pressure, was charged with hydrogen to a total pressure of 6 kg/cm² and then with ethylene to a total pressure of 10 kg/cm². The polymerization reaction was thus continued for 15 minutes with continued charge of ethylene to maintain a total pressure of 10 kg/cm². Upon completion of the reaction, the resulting polymeric slurry was taken into a beaker with hexane removed at reduced pressure. There was obtained 15.7 grams white polyethylene having a melt index of 6.1. Polymerization activity was represented by 157 grams polyethylene per gram solid per hour per ethylene pressure, or 23,740 grams polyethylene per gram titanium per hour per ethylene pressure.

INVENTIVE EXAMPLE XX (a) Preparation of the Catalyst 10 grams of magnesium chloride were dried at 150° C. for 3 hours, followed by the addition of 40 milliliters of n-hexane and 0.26 grams of aluminum tri-sec-butoxide. The admixture was reacted at 20° C. for 1 minute, whereafter 100 milliliters of n-hexane were added to settle the reaction product, with the supernatant liquid removed. The solvents were then removed at reduced pressure, whereupon there was obtained a white dry solid compound. 40 milliliters of titanium tetrachloride were added to this compound and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 13.3 milligrams of titanium carried on 1 gram solid.

(b) Polymerization

To nitrogen-purged, 2-liter stainless autoclave equipped with a stirrer were charged 1,000 milliliters hexane, 5 millimols triethyl aluminum and 100 milligrams solid of the above-stated catalyst. The whole was stirred and heated to a temperature of 90° C. The admixture having a pressure of 2 kg/cm$^2$ on account of hexane vapor pressure, was charged with hydrogen to a total pressure of 6 kg/cm$^2$ and then with ethylene to a total pressure of 10 kg/cm$^2$. The polymerization reaction was thus continued for 15 minutes with continued charge of ethylene to maintain a total pressure of 10 kg/cm$^2$. Upon completion of the reaction, the resulting polymeric slurry was taken into a beaker with hexane removed at reduced pressure. There was obtained 73 grams white polyethylene having a melt index of 6.9. Polymerization activity was represented by 730 grams polyethylene per gram solid per hour per ethylene pressure, or 54,900 grams polyethylene per gram titanium per hour per ethylene pressure.

INVENTIVE EXAMPLE XXI (a) Preparation of the Catalyst 3 grams magnesium chloride (thermally treated at 150° C. for 3 hours) and 77.7 grams aluminum tri-sec-butoxide were taken into 100 c.c. stainless autoclave equipped with a stirrer and reacted with stirring at 200° C. for 1 minute. The resulting solid reaction product was added with 40 milliliters titanium tetrachloride and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 39.7 milligrams of titanium carried on 1 gram solid.

(b) Polymerization

To nitrogen-purged, 2-liter stainless autoclave equipped with a stirrer were charged 1,000 milliliters hexane, 5 millimols triethyl aluminum and 100 milligrams solid of the above-stated catalyst. The whole was stirred and heated to a temperature of 90° C. The admixture having a pressure of 2 kg/cm$^2$ on account of hexane vapor pressure, was charged with hydrogen to a total pressure of 6 kg/cm$^2$ and then with ethylene to a total pressure of 10 kg/cm$^2$. The polymerization reaction was thus continued for 15 minutes with continued charge of ethylene to maintain a total pressure of 10 kg/cm$^2$. Upon completion of the reaction, the resulting polymeric slurry was taken into a beaker with hexane removed at reduced pressure. There was obtained 131 grams white polyethylene having a melt index of 5.8. Polymerization activity was represented by 1,310 grams polyethylene per gram solid per hour per ethylene pressure, or 32,900 grams polyethylene per gram titanium per hour per ethylene pressure.

INVENTIVE EXAMPLE XXII (a) Preparation of the Catalyst 3 grams magnesium chloride (thermally treated at 150° C. for 3 hours) and 77.7 grams aluminum tri-sec-butoxide were taken into 100 c.c. stainless autoclave equipped with a stirrer and reacted with stirring at 20° C. for 30 minutes. The resulting solid reaction product was added with 40 milliliters titanium tetrachloride and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 42.1 milligrams of titanium carried on 1 gram solid.

(b) Polymerization

To nitrogen-purged, 2-liter stainless autoclave equipped with a stirrer were charged 1,000 milliliters hexane, 5 millimols triethyl aluminum and 100 milligrams solid of the above-stated catalyst. The whole was stirred and heated to a temperature of 90° C. The admixture having a pressure of 2 kg/cm$^2$ on account of hexane vapor pressure, was charged with hydrogen to a total pressure of 6 kg/cm$^2$ and then with ethylene to a total pressure of 10 kg/cm$^2$. The polymerization reaction was thus continued for 15 minutes with continued charge of ethylene to maintain a total pressure of 10 kg/cm$^2$. Upon completion of the reaction, the resulting polymeric slurry was taken into a beaker with hexane removed at reduced pressure. There was obtained 128 grams white polyethylene having a melt index of 6.2. Polymerization activity was represented by 1,280 grams polyethylene per gram solid per hour per ethylene pressure, or 30,400 grams polyethylene per gram titanium per hour per ethylene pressure.

INVENTIVE EXAMPLE XXIII (a) Preparation of the Catalyst 10 grams magnesium chloride (thermally treated at 150° C. for 3 hours) and 0.16 grams aluminum diethoxy chloride were taken into 100 c.c. stainless autoclave equipped with a stirrer and reacted with stirring at 200° C. for 1 hour. The resulting solid reaction product was added with 40 milliliters titanium tetrachloride and heated at 150° C. for 1 hour with stirring. Excess titanium tetrachloride was removed by decantation. The admixture was thereafter washed with n-hexane until titanium tetrachloride was no longer found in the wash liquid. The resulting solid compound was analyzed to show the presence of 13.2 milligrams of titanium carried on 1 gram solid.

(b) Polymerization

To nitrogen-purged, 2-liter stainless autoclave equipped with a stirrer were charged 1,000 milliliters hexane, 5 millimols triethyl aluminum and 100 milligrams solid of the above-stated catalyst. The whole was stirred and heated to a temperature of 90° C. The admixture having a pressure of 2 kg/cm$^2$ on account of hexane vapor pressure, was charged with hydrogen to a total pressure of 6 kg/cm$^2$ and then with ethylene to a total pressure of 10 kg/cm$^2$. The polymerization reaction was thus continued for 15 minutes with continued charge of ethylene to maintain a total pressure of 10 kg/cm$^2$. Upon completion of the reaction, the resulting polymeric slurry was taken into a beaker with hexane removed at reduced pressure. There was obtained 72 grams white polyethylene having a melt index of 7.3.

Polymerization activity was represented by 720 grams polyethylene per gram solid per hour per ethylene pressure, or 54,500 grams polyethylene per gram titanium per hour per ethylene pressure.

We claim as our invention:

1. A process for the production of polyolefins which comprises polymerizing or copolymerizing olefins at a temperature of 20°–300° C. and a pressure of atmospheric to 70 kg/cm² in the presence of a catalyst resulting from:

(a) reacting a magnesium dihalide anhydride with an aluminum compound of the general formula:

$$Al(OR)_n X_{3-n}$$

where R is an alkyl, aryl and/or aralkyl group, X is a halogen atom, and n is an integer between 1 and 3, at temperatures ranging between 20° and 400° C., in a molar ratio of magnesium dihalide to aluminum compound ranging between 1:0.001 to 1:20, thereby forming a carrier;

(b) contacting a transistion metal compound with said carrier to be supported thereon at a temperature of 50° to 300° C., wherein said transition metal compound is selected from the group consisting of titanium compounds and vanadium compounds which are liquid under the treatment conditions, and are used in amounts of 0.1 to 50 times the amount of the carrier, and (c) activating the same with use of an organo-metal compound of a metal of the Groups I to IV of the Periodic Table.

2. A process as defined in claim 1 wherein said magnesium dihalide is selected from the group consisting of anhydrides of magnesium diflouride, magnesium dichloride, magnesium dibromide, magnesium diodide and mixtures thereof.

3. A process as defined in claim 1 wherein said aluminum compound is selected from the group consisting of aluminum trimethoxide, aluminum triethoxide, aluminum diethoxymono-n-propoxide, aluminum tri-n-propoxide, aluminum monoethoxydiisopropoxide, aluminum triisopropoxide, aluminum tri-n-butoxide, aluminum tri-sec-butoxide, aluminum tri-t-butoxide, aluminum triphenoxide, aluminum dimethoxymonochloride, aluminum monomethoxydichloride, aluminum diethoxymonochloride, aluminum diethoxy-monobromide, aluminum diisopropoxymonochloride, aluminum di-n-butoxymonochloride, a aluminum di-sec-butoxymonochloride, aluminum di-sec-butoxymonobromide, aluminum di-t-butoxymonochloride, aluminum diphenoxymonochloride and aluminum monoethoxymono-sec-butoxymonochloride.

4. A process as defined in claim 1 wherein said titanium compound is selected from the group consisting of titanium tetrachloride, titanium tetrabromide, ethoxy trichlorotitanium, diethoxy dichlorotitanium, dibutoxy dichlorotitanium and phenoxy trichlorotitanium.

5. A process as defined in claim 1 wherein said vandaium compound is selected from the group consisting of vanadium tetrachloride and oxytrichlorovanadium.

* * * * *